Feb. 14, 1967 B. B. WEEKES 3,304,506
SAMPLE AND HOLD SYSTEM
Filed Feb. 7, 1964
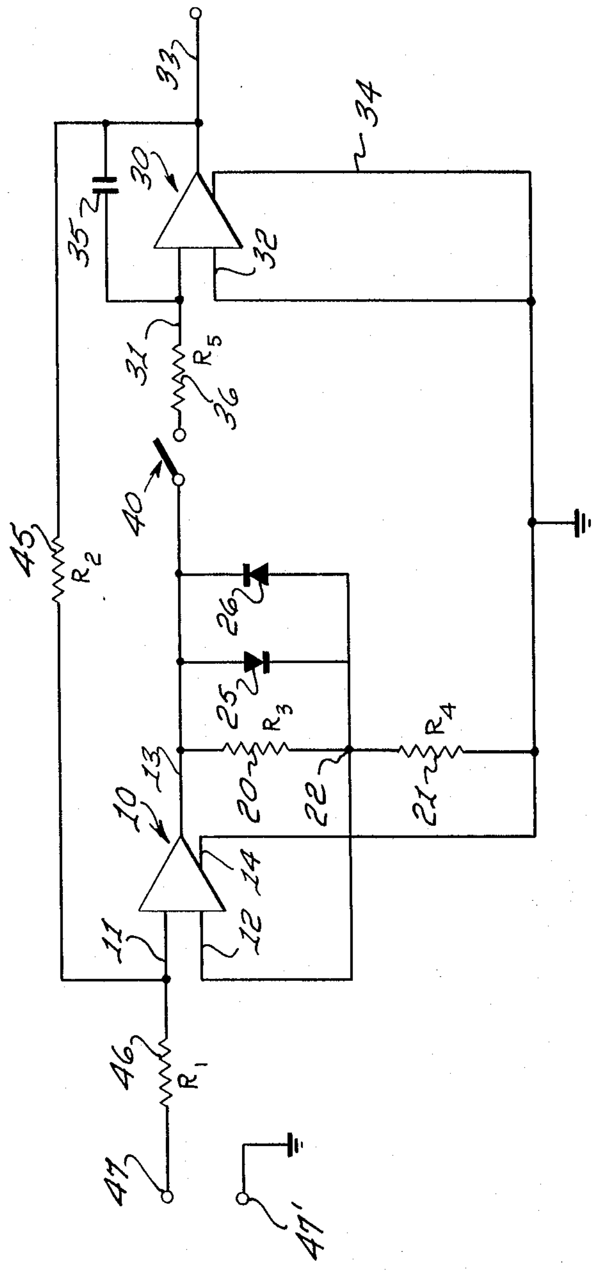
INVENTOR.
BARRET B. WEEKES
BY FOWLER, KNOBBE & GAMBRELL
ATTORNEYS United States Patent Office 3,304,506
Patented Feb. 14, 1967

3,304,506
SAMPLE AND HOLD SYSTEM

Barret B. Weekes, Newport Beach, Calif., assignor to Beckman Instruments, Inc., a corporation of California
Filed Feb. 7, 1964, Ser. No. 343,407
2 Claims. (Cl. 328—151)

The present invention relates to sample and hold systems, and more particularly, to improvements in sample and hold systems which utilize solid state amplifiers.

Sample and hold systems presently find extensive application in the electronics art. A specific field of use is in electronic sampled data systems wherein the amplitude of the input signal is sampled very accurately in the sample mode, after which this sampled value is held or stored when the hold mode is initiated. In this manner, the time at which a given signal is sampled can be determined very precisely.

Sample and hold systems presently in use generally employ a capacitive storage element in combination with an amplifier. The capacitor is charged to a value proportional to the input signal during the sample period and the amplifier input disconnected from the input data when the hold mode is initiated. The voltage stored on the capacitor is then maintained so long as current leakage into or out of the capacitor is minimized. However, in an amplifier, there is always a small amount of input current flow. Thus, the grid current of a vacuum tube amplifier is of the order of 10 picoamperes and is substantially higher in transistor amplifiers wherein even a low current ejection differential amplifier has an input current flow of the order of 100 nanoamperes. The voltage across the capacitor will thus change or droop with time and provide only an accurate short-time hold interval. Attempts to lengthen the hold time by increasing the capacitance value deleteriously affects the ability of the system to quickly store the sampled signal. Thus, the RC time constant delays the appearance of the input signal at the output of the amplifier. For example, the appearance on the amplifier output of the input signal to within 0.005% of final value is delayed by 10RC. It will be apparent that an increase of the capacitor value will proportionately lengthen the time interval necessary for storing the sampled input signal.

It is an object of this invention to provide an improved sample and hold system which permits the RC value to be decreased without introducing additional time constants or loop stability problems.

In brief, a preferred embodiment of this invention comprises a first amplifier potentiometrically connected with low gain and coupled to an active operational integrator during the sample period and disconnected therefrom during the hold period. The output of the operational integrator is connected to the input of the first amplifier through a feedback network to provide an overall operational configuration. When connected in this manner, the predominant frequency roll-off or frequency attenuation of the loop gain is the associated RC time constant of the integrator which for this system is a single pole providing a 6 decibel per octave attenuation, thereby maintaining a 90° phase margin between the input and feedback signals. The loop gain is substantially derived from the active integrator stage, thereby materially reducing the frequency response requirement for the first amplifier stage which provides an extremely wide bandwidth with no inherent roll-off.

Reference is made to the copending application of Leland B. Smith et al. entitled "Sample and Hold System Having an Overall Potentiometric Confriguration," Serial No. 343,416, filed on even date herewith and assigned to Beckman Instruments, Inc., assignee of the present invention. This application discloses a sample and hold system incorporating certain claimed features of the present invention.

A more thorough understanding of the invention may be obtained by a study of the following detailed description taken in connection with the accompanying drawing wherein is shown a schematic circuit of a sample and hold system constructed in accordance with this invention.

Referring now to the figure, the first amplifier stage 10 advantageously comprises a low-drift differential amplifier having first and second input terminals 11, 12 floating with respect to ground and signal output terminal 13 and grounded output terminal 14. Resistive impedances 20 ($R_3$) and 21 ($R_4$) serially connected between the output terminals 13, 14 supply voltage feedback of the potentiometric type to provide amplifier stage 10 with a high input impedance. Node 22 common to these resistive impedances is connected to the input terminal 12 so that the voltage across impedance $R_4$ is connected in series with the external input signal applied to amplifier 10. Oppositely poled diodes 25, 26 are connected in parallel across resistor 20 and change the input amplifier gain to unity when the voltage across resistor 20 attempts to exceed the forward bias breakdown voltage of these diodes.

A second amplifier stage 30 is connected as an active operational integrator and includes a single ended amplifire stage having a signal input terminal 31, grounded input terminal 32, signal output terminal 33 and grounded output terminal 34. Input and output signal terminals 31, 33 are connected by capacitor 35 to provide the conventional operational integrator circuit. An input resistance 36 ($R_5$) is connected to signal input terminal 31.

Amplifier stages 10 and 30 are advantageously constructed according to the teachings of the copending application of Leland B. Smith et al., Serial No. 338,362, filed January 17, 1964, entitled "Temperature Compensated Transistor Amplifiers," assigned to Beckman Instruments, Inc., assignee of the present invention. This application teaches and claims improved transistor amplifier circuitry which compensates for the effects of base current variations due to temperature variations in the base current gain perameter $\beta$ and the effects of mismatched thermocoefficients of the base-emitter voltage perameter $V_{be}$. These amplifiers are thus very low drift amplifiers and have a very low front end current ejection, the latter being a partilcular advantage in the second amplifier stage 30 since the leakage rate of the capacitor 35 is substantially dependent upon the input current flow of the second stage during the hold interval.

Single pole, single throw switch 40 is serially connected between the output terminal 13 of output stage 10 and the input resistor 36 of amplifier stage 30 and provides a means for selectively interconnecting the output of the first amplifier to the input of the second amplifier to provide the selected sample and hold modes as described hereinafter. This switch will normally comprise a high speed solid state switch of which many embodiments are well known in the art so as to provide switching times compatible with the information signal being sampled.

A resistive impedance 45 ($R_2$) is connected between the signal output terminal 33 of the second amplifier stage 30 and the input terminal 11 of the first amplifier stage. Resistor 45 and resistor 46 ($R_1$) connected between the system input terminal 47 and the input terminal 11 provides an overall operational configuration when switch 40 is in the closed or sample position. When switch 40 is in the open or hold condition, the overall operational configuration is nonexistent.

The operation of the sample and hold system described is as follows: During the sample mode, switch 40 is closed to provide the overall operational configuration. Capacitor 35 is then charged to a voltage proportional to the input voltage applied between system input terminals 47, 47'. More specifically, the overall gain of the operationally connected system is defined by the ratio $R_2/R_1$. The potentiometrically connected first amplifier stage is a non phase inverting stage whereas the second operational integrator provides a 180° phase reversal, thereby applying feedback voltage on resistor $R_2$ substantially opposite in phase to the input signal input.

When the switch 40 is opened at the start of the hold interval, the overall operational configuration is nonexistent and the voltage of capacitor 35 is a replica of the input voltage that existed at the time that the switch was closed. This capacitor voltage is the output voltage since the summing node of the operational amplifier is virtual ground. In the hold mode, the capacitor voltage will droop at the rate of $$\frac{de}{dt}=\frac{i}{C} \text{ volts/second} \qquad (1)$$

where $i$ is the current ejected out of the front end of the integrator amplifier. The potentiometrically connected first amplifier stage provides a low impedance output for driving the operational output stage whose input impedance is quite low because of the low value of resistance $R_5$. In effect, the first amplifier stage provides an impedance transformation between a high input impedance and a low output impedance. As described above, the value of this resistance should be small so as to reduce the RC time constant of the system, particularly when the value of the capacitance must necessarily be relatively large as shown by Equation 1 to compensate for the input current flow of the associated amplifier stage. Representative values for these components are 50 ohms for $R_5$ and 0.2 microfarad for capacitor 35 giving a time constant of 10 microseconds. Also, any voltage offsets introduced by the solid state switch 40 and the front end of the second integrator amplifier stage 30 are reduced by the gain of the first amplifier stage.

While the output of the sample and hold system is essentially constant during the hold mode, the input applied to terminals 47, 47' may vary from positive to negative or negative to positive full scale and hence tend to lock up the input potentiometric amplifier stage 10. In order to prevent overloading of this stage, diodes 25, 26 form a dynamic clamp and limit the voltage across resistor $R_3$ to the small forward bias breakdown voltage diodes. Since the gain of the first amplifier stage 10 is given by the expression $R_3+R_4/R_4$, the amplifier gain is effectively changed to unity when the diodes conduct and thus prevents saturation of the input amplifier stage. As a result, the initial amplifier stage need have only limited dynamic range without deleteriously affecting the response time of the sample and hold system.

A very significant feature of the present invention is that the operational integrator stage provides (1) the memory storage of the sample and hold system, (2) the predominant rolloff or attenuation of the loop gain with frequency which is given by a single pole $1/2\pi R_5CG$ where G is the forward link gain of amplifier 30 without feedback and C is the capacitance of capacitor 35, and (3) all or substantially all of the forward gain of the sample and hold system.

The single pole rolloff provides an attenuation slope of 6 decibels per octave for the frequency range below that frequency value associated with unity gain. Accordingly, for feedback signal energy within the frequency range characterized by higher than unity gain, i.e. the useful frequency range, the feedback signal is inverted for a 180° phase change by stage 30 and in addition, all frequency energy above a very low frequency value, e.g. .02 c.p.s., is delayed in phase an additional 90° by the single pole defined above for a total phase change of 270°. Loop stability is thus insured by a 90° phase margin between the feedback and feedforward signals.

Since the operational integrator provides the forward gain for the sample and hold system, the first amplifier stage is advantageously constructed as a low or unity gain stage. Accordingly, this stage can provide an extremely wide bandwidth with no inherent rolloff in this band.

Sample and hold systems constructed in the manner described above exhibit a very low gain instability of the order of 0.005 percent for one year; a minimum sampling time, e.g. a sampling duration of 5 microseconds insures settling to within 0.01 percent of final value for a full scale input signal of 10 volts; precise execution of a hold-mode command, e.g. 0.125 microsecond uncertainty; and low holding droop, e.g. 0.01 percent of full scale per 0.33 millisecond.

Although an exemplary embodiment of the invention has been disclosed and discussed, it will be understood that other applications of the invention are possible and that the embodiment disclosed may be subjected to various changes, modifications and substitution without necessarily departing from the spirit of the invention.

I claim:

1. A system for selectively sampling and holding an input signal having a first amplifier comprising a low-drift differential amplifier having first and second input terminals floating with respect to ground and signal and grounded output terminals;

means coupled to said first amplifier for providing potentiometric feedback comprising first and second impedances serially connected between the output terminals of said first amplifier and means connecting the node common to both impedances to the second input terminal of said first amplifier;

a second amplifier comprising a low front end current ejection, single ended amplifier having signal and grounded input terminals and signal and grounded output terminals;

means for connecting said second amplifier as an active operational integrator comprising a capacitive impedance connected between the signal input and output terminals of said second amplifier and an input resistor connected to the signal input terminal of said second amplifier;

means for selectively interconnecting said signal output terminal of said first amplifier to said signal input terminal of said second amplifier to provide the sample mode wherein said capacitor is charged to a voltage proportional to said input signal comprising a single pole, single throw switch connected between said signal output terminal of said first amplifier and said input resistor of said second amplifier; and means for providing an overall operational configuration when said switch is closed comprising a feedback resistive impedance connected between the signal output terminal of said second amplifier and the first input terminal of said first amplifier, and an input resistive impedance connected to the first input terminal of said first amplifier.

2. A system for selectively sampling and holding an input signal having a first amplifier having input and output terminals comprising a low-drift differential amplifier;

means coupled from said output to said input terminals of said first amplifier for providing potentiometric feedback;

a second amplifier having input and output terminals comprising a low front end current ejection, single ended amplifier;

means coupled to said second amplifier to provide an operational integrator;

means for selectively interconnecting said output terminals of said first amplifier to said input terminals of said second amplifier to provide the sample mode wherein said operational integrator is charged to a voltage proportional to said input signal; and means for providing an overall operational configuration when said interconnecting means is closed including a resistive impedance means connected between the output terminals of said operational integrator stage and the input terminals of said first amplifier.

References Cited by the Examiner

UNITED STATES PATENTS

| | | | |
|---|---|---|---|
| 3,058,068 | 10/1962 | Hinrichs et al. | 330—10 |
| 3,109,930 | 11/1963 | Macdonald | 328—127 X |
| 3,127,565 | 3/1964 | Williams | 328—127 |
| 3,154,749 | 10/1964 | Perkins | 328—151 X |
| 3,229,212 | 1/1966 | Rogers | 328—151 X |

OTHER REFERENCES

Huskey et al.: Computer Handbook, McGray-Hill, New York, 1962, QA76H8, C. 3, pages 6–26, 6–27.

ROY LAKE, *Primary Examiner.*

J. B. MULLINS, *Assistant Examiner.*